L. R. HEIM.
METHOD OF GRINDING HARDENED ROLLS.
APPLICATION FILED JULY 3, 1916.
1,281,366.
Patented Oct. 15, 1918.
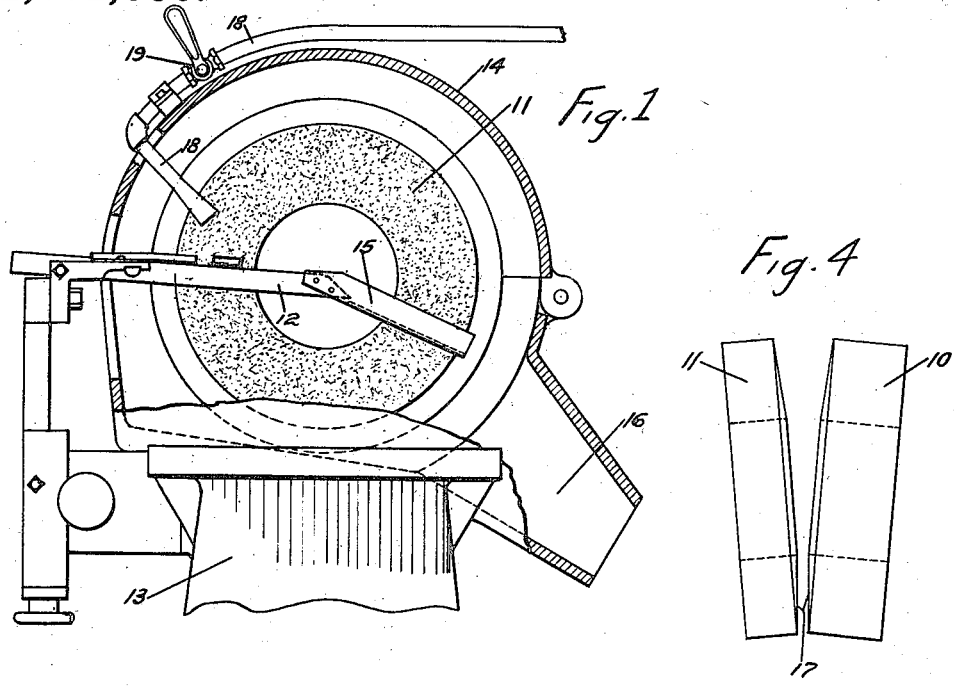
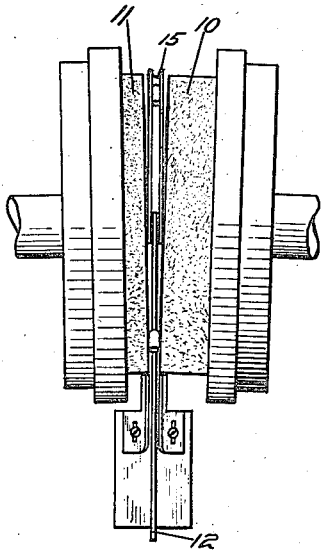
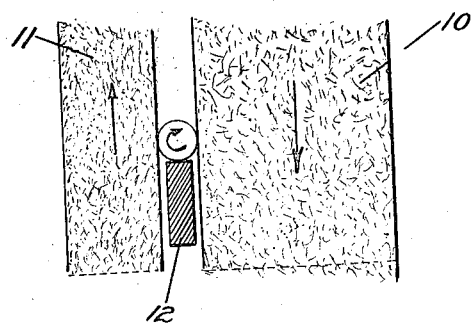
WITNESSES:
Chester F. Hayden
INVENTOR
Lewis R. Heim
BY
A. M. Wooster
ATTORNEY

UNITED STATES PATENT OFFICE.

LEWIS R. HEIM, OF DANBURY, CONNECTICUT, ASSIGNOR TO THE BALL AND ROLLER BEARING COMPANY, OF DANBURY, CONNECTICUT, A CORPORATION OF CONNECTICUT.

METHOD OF GRINDING HARDENED ROLLS.

1,281,366.  Specification of Letters Patent.  Patented Oct. 15, 1918.

Original application filed March 6, 1915, Serial No. 12,524. Divided and this application filed July 3, 1916. Serial No. 107,246.

*To all whom it may concern:*

Be it known that I, LEWIS H. HEIM, a citizen of the United States, residing at Danbury, county of Fairfield, State of Connecticut, have invented an Improvement in Methods of Grinding Hardened Rolls, of which the following is a specification.

This invention relates to the grinding of hardened rolls for use in bearings and for other purposes and the present application is a division of my application for patent for roll grinding machine, Ser. No. 12,524, filed March 6, 1915, upon which Patent No. 1,210,937, was granted on January 2, 1917.

In the accompanying drawing forming a part of this specification,

Figure 1 is a view of a machine such as that to which I have referred, partly in elevation and partly in section;

Fig. 2 a detail plan view corresponding therewith;

Fig. 3 a detail view on an enlarged scale, partly in elevation and partly in section, illustrating the grinding operation, and Fig. 4 is a diagrammatic view illustrating grinding and regulating wheels having their contiguous faces formed with slight bevels.

A preferred form of machine for carrying out my improved method, as shown in the drawings, comprises a grinding wheel having a relatively high surface speed, a wheel moving in the opposite direction and having a relatively low surface speed, the action of which is to cause constant and uniform rotation of the rolls while being operated upon at a much lower surface speed than the grinding wheel, and which I term the regulating wheel for the reason that it regulates the speed at which the rolls rotate while being operated upon, an inclined track upon which the rolls travel while being operated upon, and means for supplying water to the operative surfaces. 10 denotes the grinding wheel, 11 the regulating wheel having a suitable holding surface, 12 an inclined bar of less width than the diameter of the finished rolls and interposed between the grinding faces of the wheels to provide a supporting track for the rolls, 13 the framework of the machine, 14 a hood which incloses the grinding and regulating wheels, 15 a trough into which the finished rolls drop, and 16 a chute into which the rolls drop from the trough and which delivers them into a suitable receptacle.

The grinding and regulating wheels are journaled slightly obliquely relatively to each other so that their contiguous faces lie closer together upon one side than upon the other, and said wheels are journaled in a plane slightly oblique to the horizontal plane of the machine, so as to place the operative faces of said wheels slightly oblique to the vertical plane, the regulating wheel being on the relatively low side. The object in journaling the wheels with their operative faces oblique to each other is to provide space between them for the removal of the rolls after they have been ground. Where both wheels are set slightly obliquely to the central longitudinal line of the machine, the faces of both wheels are beveled as at 17 in Fig. 4, so as to provide parallel operative surfaces. The same result may be accomplished by journaling one of the wheels, for example the grinding wheel, longitudinally of the machine, and journaling the regulating wheel obliquely. This would require the beveling of the face of the regulating wheel only. Briefly, then, either or both of the wheels may be journaled obliquely, either or both being beveled to correspond with the adjustment of the wheels.

The object in journaling both the grinding and regulating wheels in a plane slightly oblique to the horizontal plane of the machine so as to slightly tilt the operative surfaces of the wheels relatively to the vertical plane, is to utilize gravity to move the rolls while being operated upon against the regulating wheel, the grinding wheel being always placed on the relatively high side and the regulating wheel on the relatively low side. This feature of construction is of importance as it insures constant and uniform rotation of the rolls and uniform grinding thereof, scratching of the rolls and the grinding of flats thereon being wholly prevented. The rolls to be operated upon may be fed to the machine in any ordinary or preferred manner; for example, as shown in the application of which this application is a division. After passing the operative faces of the wheels, the finished rolls drop into the trough, which is shown as secured to the inner end of the inclined track, by which they are conducted outward between the faces of the wheels on the opposite side of the center (which on that side lie at a greater distance apart.) The rolls drop from the trough into the chute which delivers them into a suitable receptacle. Adjustments fully described in my said patent referred to enable the operator to correctly position the carrier with relation to the grinding and regulating wheels and to provide for different sizes of rolls and the changes in thickness of either the grinding or the regulating wheel or both. It is of course necessary that the track should be placed slightly above a horizontal line intersecting the axial line of the wheels, and it is obvious that by raising the track, the amount of grinding action to which each roll will be subjected will be lessened, as the rolls will be drawn forward more rapidly. The rolls are kept cool while being operated upon by water supplied to the rolls, the track, and the surfaces of the grinding and regulating wheels in any suitable manner, as by means of a pipe 18 shown as provided with a stop-cock 19.

It will be seen that in the carrying out of my improved method when a roll is picked up by the grinding and regulating wheels, the action is to draw the roll forward, keep it constantly rotating and to pass it through between the operative faces of the wheels. It will be noted (see Fig. 3) that the operative face of the grinding wheel is traveling downward and the operative face of the regulating wheel is traveling upward. As the surface speed of the grinding wheel is much greater than that of the regulating wheel, it follows that the rolls being operated upon will be held down upon the track, will be rotated, and will also be drawn forward. The tendency of the regulating wheel to hold the rolls backward is wholly overcome by the greater surface speed and greater hold upon the rolls of the grinding wheel. The regulating wheel, however, has this very important function, in that it insures constant rotation of the rolls so that I am enabled to produce by my novel method, much more rapidly and economically than has heretofore been possible, rolls of the very highest grade.

Having thus described my invention, I claim:—

1. The method of grinding rolls which consists in presenting blanks between a grinding surface and a regulating surface, and successively advancing said blanks to a point of final discharge by causing said surfaces to travel in opposite directions at different speeds, and utilizing gravity to insure a constant and uniform rotation of the blank while in contact with the grinding surfaces.

2. The method of grinding rolls which consists in presenting blanks between a grinding surface and a regulating surface, and successively advancing said blanks to a point of final discharge by causing said surfaces to travel in opposite directions at different speeds, and maintaining said surfaces in different horizontal planes and also in a plane slightly oblique to the vertical whereby the gravity of the blank will be utilized to insure a continuous uniform rotation thereof.

In testimony whereof I affix my signature.

LEWIS R. HEIM.